US012607200B2

(12) United States Patent
Sieger et al.

(10) Patent No.: US 12,607,200 B2

(45) Date of Patent: Apr. 21, 2026

(54) INLET NOZZLE ASSEMBLY AND TURBOMACHINE WITH AN IMPELLER AND AN INLET NOZZLE ASSEMBLY

(71) Applicant: ebm-papst St. Georgen GmbH & Co. KG, St. Georgen (DE)

(72) Inventors: Tobias Sieger, Geisingen (DE); Saurabh Gupta, St. Georgen (DE)

(73) Assignee: ebm-papst St. Georgen GmbH & Co. KG, St. Georgen (DE)

( * ) Notice: Subject to any disclaimer, the term of this patent is extended or adjusted under 35 U.S.C. 154(b) by 0 days.

(21) Appl. No.: 19/181,683

(22) Filed: Apr. 17, 2025

(65) Prior Publication Data

US 2025/0327465 A1 Oct. 23, 2025

(30) Foreign Application Priority Data

Apr. 19, 2024 (DE) ......................... 102024110983.1

(51) Int. Cl.
*F04D 29/52* (2006.01)

(52) U.S. Cl.
CPC ........ *F04D 29/52* (2013.01); *F05D 2240/126* (2013.01); *F05D 2250/51* (2013.01)

(58) Field of Classification Search
CPC ..................... F04D 29/52–548; F05D 2250/51
See application file for complete search history.

(56) References Cited

FOREIGN PATENT DOCUMENTS

FI 89975 * 8/1993

OTHER PUBLICATIONS

Machine translation (Year: 1993).*

* cited by examiner

*Primary Examiner* — Brian O Peters
(74) *Attorney, Agent, or Firm* — Dickinson Wright PLLC

(57) ABSTRACT

An inlet nozzle assembly for the suction-side arrangement on an impeller rotatable about a rotational axis, having a front end section and an adjoining casing section. The casing section has a wall surrounding the rotational axis which forms a receiving space for receiving the impeller, so that a radial gap is formed in the radial direction between the circumferential wall and a radially outer end section of the impeller, and the end section has a front wall with an inlet nozzle which extends into the receiving space. In the end section between the front wall and a front side of the impeller an axial gap is formed, wherein radial ribs extend from the circumferential wall into the receiving space to reduce the radial gap, and/or that axial ribs extend from the end wall to the receiving space to reduce the axial gap.

13 Claims, 2 Drawing Sheets

INLET NOZZLE ASSEMBLY AND TURBOMACHINE WITH AN IMPELLER AND AN INLET NOZZLE ASSEMBLY

RELATED APPLICATIONS

This application claims priority to German Patent Application No. 10 2024 110 983.1, filed Apr. 19, 2024, the entire contents of which is incorporated herein by reference in its entirety.

FIELD

The present disclosure relates to an inlet nozzle assembly for suction-side arrangement on an impeller rotatable about a rotation axis. Furthermore, the disclosure relates to a turbomachine, for example a fan, a ventilator or a blower, with an impeller that can be driven about a rotational axis and an inlet nozzle assembly.

BACKGROUND

A variety of inlet nozzle assemblies and also turbomachines are known from the prior art, which have an inlet nozzle assembly and an impeller.

However, it is often problematic that there is an axial gap and/or a radial gap between the inner surfaces of the inlet nozzle assembly and the impeller or its radially outer end section or, if present, its cover plate, so that part of the flow generated by the impeller can flow back through the axial and/or radial gap from an outflow side of the impeller to an inflow side of the impeller.

As a result, the flow generated by the impeller is divided into an actually usable primary flow and a secondary flow existing between the outflow side and the inflow side, which is generally unusable, which can consequently deteriorate the pressure and volume flow curve or, in general, the performance of such a turbomachine. Furthermore, the acoustic behavior can also deteriorate.

BRIEF SUMMARY

The present disclosure overcomes the aforementioned disadvantages and provides an inlet nozzle assembly by means of which the secondary flow or a flow running on an impeller from an outflow side to an inflow side can be reduced.

According to the present disclosure, an inlet nozzle assembly is therefore proposed for arrangement on the suction side of an impeller rotatable about a rotational axis, with said impeller featuring a cover plate. The inlet nozzle assembly has a front end section and an adjoining casing section. The front end section and the casing section can also be understood as an impeller housing or part of such a housing; these can also be designed as a single piece or as separate parts. With regard to ease of manufacture, the front end section and the shell section are preferably manufactured by an injection molding process and designed to be easy to demold. The casing section has a wall which in particular completely surrounds the axis of rotation and which forms a receiving space for receiving the impeller and the complete housing of the cover plate of the impeller, so that a radial gap is formed in the radial direction between the circumferential wall or its inner surface and a radially outer end section of the impeller, i.e. in particular an imaginary casing surface or the cover plate formed by the radially outer end section. The end section has a front wall with an inlet nozzle, whereby the inlet nozzle extends into the receiving space. According to the generic type, the inlet nozzle is preferably arranged coaxially to the axis of rotation and is designed to direct a fluid flow to the inflow side of the impeller. For this purpose, the inlet nozzle or an outflow-side end section of the inlet nozzle can extend into the impeller or its cover plate without contact or towards the impeller or its cover plate. In the front end section, an axial gap is formed between the front wall and a front side of the impeller or the cover plate facing the front wall in particular. Both the radial gap and the axial gap are particularly annular or hollow-cylindrical in shape, with the radial gap being radially adjacent to the impeller or the cover plate and the axial gap being axially adjacent to it. According to the present disclosure, first ribs, which can be designated as radial ribs, extend from the circumferential wall into the receiving space and are designed to reduce the radial gap and in particular to reduce it to a minimum. Additionally or alternatively, the invention provides that second ribs, which can be designated as axial ribs, extend from the front wall in the direction of the receiving space or to the receiving space, which second ribs are designed to reduce the axial gap and in particular to reduce it to a minimum.

For both a reduction of the radial gap to a minimum and a reduction of the axial gap to a minimum, the respective ribs preferably extend contact-free to a predetermined distance from the impeller or to the cover plate, by means of which rotation of the impeller about the axis of rotation remains possible, but the secondary flow is reduced to a minimum.

Likewise, for the reduction of the radial gap to a minimum as well as for the reduction of the axial gap to a minimum, it can apply that the impeller has a concentricity or a predetermined concentricity tolerance and describes a maximum contour determined by the concentricity tolerance through its radially outer end section or the lateral surface determined thereby and preferably through its cover plate during rotation about the axis of rotation at a designated and in particular designated maximum rotational speed, wherein the axial ribs and/or radial ribs extend without contact up to the maximum contour. As a result, the radial or axial gap is reduced to a minimum, which is determined by the concentricity of the impeller at a maximum permissible rotational speed.

If both radial ribs and axial ribs are provided, these can be formed at least partially integrally together in a single piece. For example, an axial rib can transition into a radial rib or vice versa.

An advantageous further development provides that the radial ribs are designed to correspond to the radially outer end section of the impeller and in particular to an outer contour of the cover plate. It can be provided that radially inner edges of the radial ribs or a radially inner contour of the radial ribs are or is designed to follow the outer contour of the radially outer end section of the impeller, and in particular of the cover plate, and to correspond to this.

Consequently, the radially inner edges of the radial ribs preferably together span a surface or several surfaces as part of a negative section corresponding to the outer contour of the impeller or its cover plate.

However, the same applies to the axial ribs, which are preferably designed to correspond to an outer contour of the impeller or the cover plate and in particular to a front end section of the impeller or the cover plate.

Furthermore, it is preferable that the front wall has a thickness or material thickness in the axial direction by which an axial length of the inlet nozzle is determined, wherein the thickness is selected in particular to reduce the axial gap to a minimum.

Although the radial ribs are preferably arranged uniformly and thus regularly in the circumferential direction around the axis of rotation, an advantageous variant provides that the radial ribs are irregularly and/or unevenly distributed and/or asymmetrically arranged in the circumferential direction around the axis of rotation.

At least one section of at least one radial rib can also extend tilted relative to the axis of rotation, wherein preferably at least one radial rib and further preferably all radial ribs extend tilted relative to the axis of rotation over their entire length.

Furthermore, at least one section of at least one radial rib can be wound and in particular extend helically around the axis of rotation, wherein it also applies here that preferably at least one radial rib and further preferably all radial ribs extend wound around the axis of rotation over their entire length, i.e. extend in the circumferential direction.

Furthermore, it can be provided that at least one radial rib intersects the axis of rotation in an imaginary extension in the radial direction, i.e. extends in a star shape towards the axis of rotation. Alternatively, at least one radial rib can, in an imaginary extension, form a tangent to an also imaginary circle concentric with the axis of rotation, whereby at least one radial rib can also be described as being offset or tilted in the circumferential direction. The radial rib or ribs can extend in a predetermined direction of rotation of the impeller or against a predetermined direction of rotation of the impeller. This preferably applies to all ribs.

Both for a tilted or offset and for a twisted embodiment, it applies that these are preferably tilted against a flow angle or against a swirl of a flow flowing out of the impeller and in particular a flow flowing out of the impeller into the radial gap, so that an additional flow resistance can be generated.

Irrespective of the fact that the radial ribs extend in the radial direction adjacent to the impeller or the cover plate, it is preferably provided that the radial ribs are designed to extend in the axial direction with their axial end sections and in particular on an outflow side beyond the radially outer end section of the impeller and in particular beyond the cover plate.

The radial ribs can form a guide device with their axial end sections, which is designed to direct a flow emerging from the impeller away from the radial gap, and/or is designed to aerodynamically continue an imaginary lateral surface of the impeller formed by the radially outer end section of the impeller or, in particular, a surface formed in an outflow section of the cover plate and/or a flow channel of the cover plate.

A further aspect of the present disclosure relates to a turbomachine with an impeller that can be driven about a rotational axis and an inlet nozzle assembly according to the invention. The impeller is accommodated in the receiving space of the inlet nozzle assembly so as to be rotatable about the rotation axis and is designed to generate a flow from an inflow side to an outflow side when rotating about the rotation axis, where the flow can be divided into primary and secondary flows as explained.

The impeller may in particular be an axial, diagonal or radial impeller, whereby based on this, the turbomachine may also be designed to generate an axial, diagonal or radial flow or may be an axial, diagonal or radial flow machine.

As already explained, the impeller can have a predetermined concentricity tolerance and, through its radially outer end section, the imaginary shell surface determined thereby or, if present, through its cover plate, describe a maximum contour determined by the concentricity tolerance during rotation about the axis of rotation at a specified rotational speed and in particular a specified maximum rotational speed, wherein the axial ribs and/or radial ribs can extend contact-free up to the maximum contour, i.e. not only in the direction of the maximum contour, but up to it.

The features disclosed above can be combined as desired, as long as this is technically possible and they do not contradict each other.

BRIEF DESCRIPTION OF THE DRAWINGS

Other advantageous developments of the present disclosure are characterized in the subclaims or are presented in more detail below together with the description of the preferred embodiment of the invention with reference to the figures. They show:

Figure 1:
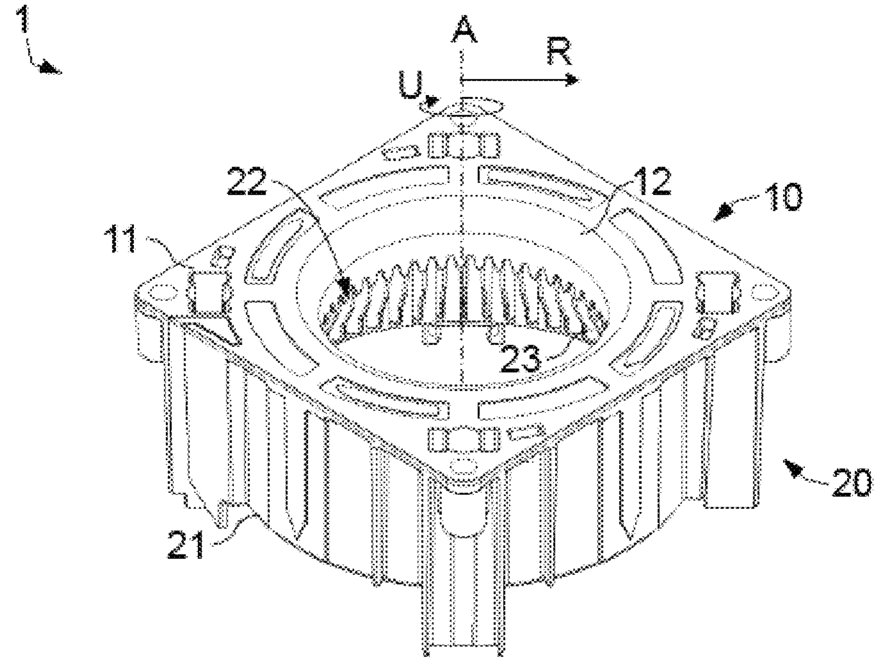
FIG. 1 an inlet nozzle assembly.

The figures are schematic by way of example. The same reference numerals in the figures indicate the same functional and/or structural features, whereby the inlet nozzle assembly 1 shown in FIG. 1 can be the inlet nozzle assembly 1 shown in section in FIG. 2, which can also be the inlet nozzle assembly 1 shown with the impeller 40 according to FIG. 3.

DETAILED DESCRIPTION

Figure 2:
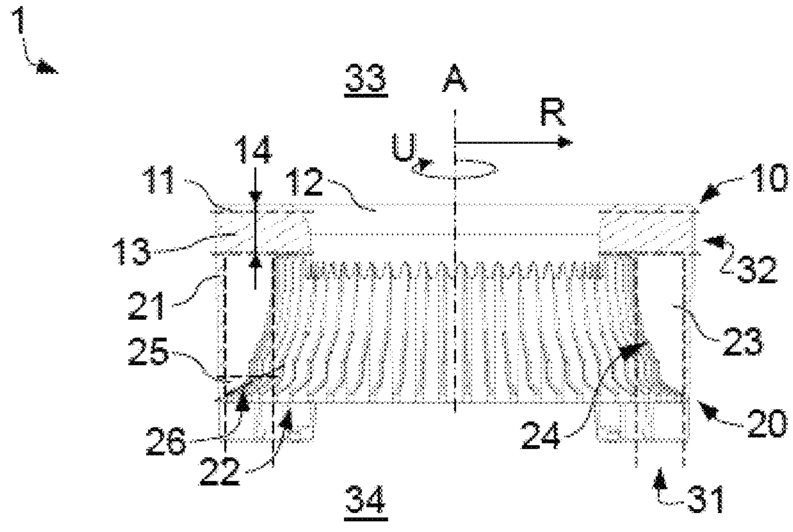
FIG. 2 a sectional view of an inlet nozzle assembly.
Figure 3:
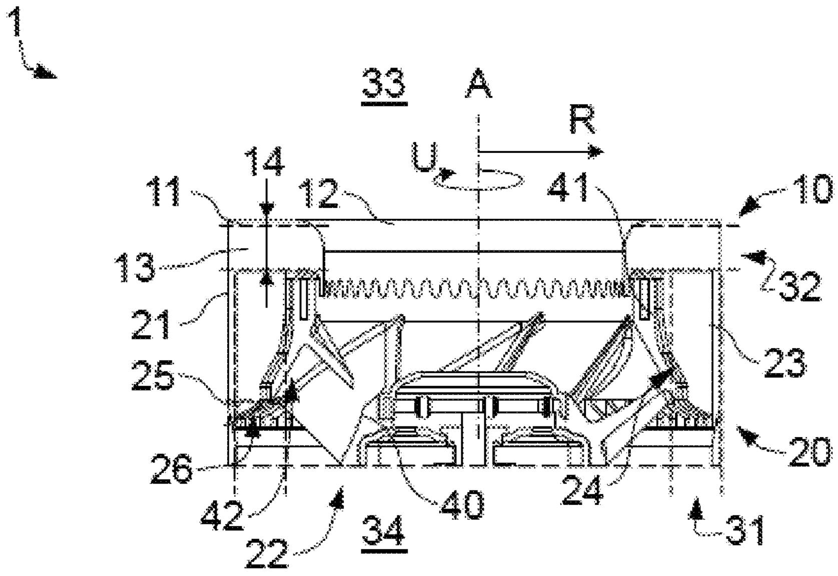
FIG. 3 an inlet nozzle assembly with an impeller housed therein.

The inlet nozzle assembly 1, as shown in FIGS. 1 to 3, may be part of a housing which may be arranged around an impeller 40 and a motor driving the impeller 40 about a rotational axis A.

The inlet nozzle assembly 1 has essentially two sections with a front end section 10 and an adjoining casing section 20, which can also be integrally connected to each other and therefore be a single piece.

The front end section 10 has a front wall 11 through which an inlet nozzle 12 concentric with the rotation axis A is defined.

The casing section 20 also has a wall 21, which is designed as a wall 21 that completely surrounds the rotation axis A in the circumferential direction U, so that a receiving space 22 for receiving the impeller 40 and completely receiving a cover plate 41 of the impeller 40 is formed in the interior of the inlet nozzle assembly 1, as is also shown, for example, in FIG. 3.

If the inlet nozzle assembly 1 is arranged on the impeller 10, a gap is created between the cover plate 41 of the impeller 40 and the inlet nozzle assembly 1 or its walls 11, 21. The gap created between the cover plate 41 and the circumferential wall 21 and thus adjacent to the cover plate 41 in the radial direction R is referred to as radial gap 31. The gap which arises between the end face of the cover plate 41 facing the inflow side 33 and the end wall 11 and thus adjoins the cover plate 41 in the axial direction, i.e. along the axis of rotation A, is referred to as the axial gap 32.

In order to prevent or reduce a secondary flow from the outflow side 34 through the radial gap 31 and the axial gap 32 to the inflow side 33 during rotation of the impeller 40 about the axis of rotation A, the variant shown here according to FIG. 1 provides that radial ribs 23 extend from the circumferential wall 21 into the radial gap 31 and thus reduce it, wherein the radial gap 31 is thereby effectively formed and delimited by the cover plate 41 and the radially inner edges 24 of the radial ribs 23 or a surface spanned by the radially inner edges 24 of the radial ribs 23, as can also be seen in FIG. 3.

To reduce the axial gap 32, essentially two variants are possible, both of which can be seen as shown in FIGS. 2 and 3. Either axial ribs 13 extend from the front wall 11 into the axial gap 32, so that the latter is effectively determined or formed by the cover plate and radially inner edges of the axial ribs 13, or a thickness 14 or a material thickness 14 of the front wall 11 is selected such that, on the one hand, it essentially determines an axial length of the inlet nozzle 12 and, on the other hand, the axial gap 32 is reduced to a minimum. Even if the thickness 14 or the material thickness 14 is selected accordingly, hollow chambers or recesses can be provided inside the wall in order to reduce the material requirements and the weight. An inner surface provided by the front wall 11 thus directly adjoins the cover plate 41 of the impeller 40 without contact and, together with the cover plate 41, determines the reduced axial gap 32.

In order to deflect or divert a flow from the axial gap 31 which flows out of the impeller 40 or out of flow channels defined by the impeller 40, it is also provided that the radial ribs 23, as can be seen in both FIGS. 2 and 3, protrude with an axial end section 25 in the axial direction beyond the cover plate 41. It is particularly advantageous that the axial end sections 25 together span a surface 26 which extends or continues a surface 42 of the cover plate 41 which delimits a flow channel.

As can be seen in particular in FIG. 3, the radial ribs 23 correspond to the cover plate 41 in such a way that the radially inner edge 24 is subdivided into several subsections, each of which runs parallel to a subsection of the outer contour of the cover plate 41, this being advantageous but not absolutely necessary.

Furthermore, a variant is shown in which the radial ribs 23 are, on the one hand, evenly distributed in the circumferential direction U and, on the other hand, extend completely parallel to the axis of rotation A. However, it has been found that it is advantageous if the radial ribs 23 are unevenly distributed in the circumferential direction U and/or are wound around the axis of rotation A or are tilted relative to the axis of rotation A and in the circumferential direction U.

Figure 4:
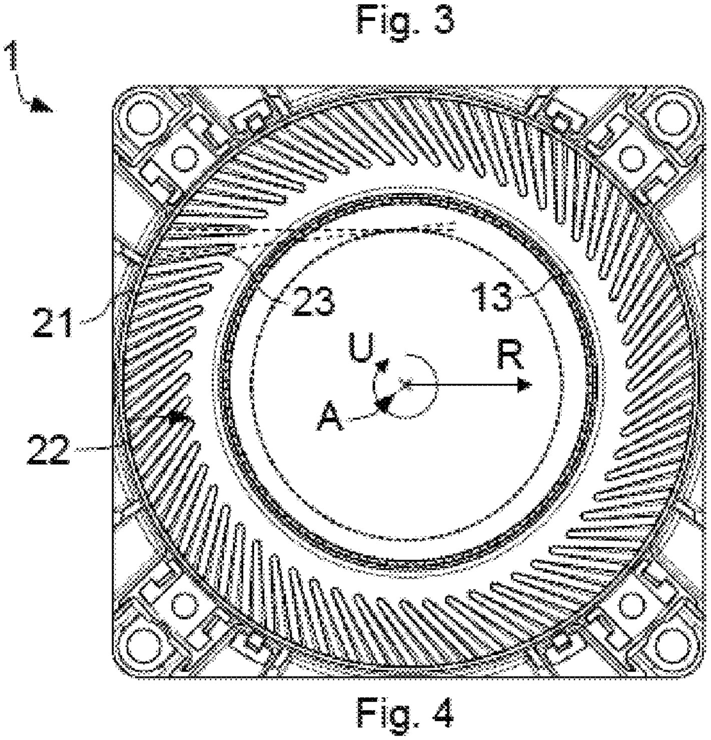
FIG. 4 an inlet nozzle assembly with circumferentially tilted ribs.

A variant of an inlet nozzle assembly 1, in which the ribs 23 are tilted in the circumferential direction U, is shown in FIG. 4. In other respects, however, the inlet nozzle assembly 1 is identical to the embodiment described with reference to FIGS. 1 to 3. In the variant or variants of FIGS. 1 to 3, the ribs 23 extend in an imaginary extension towards the axis of rotation A. Deviating from this, according to FIG. 4, it is provided that the ribs 23 form, in an imaginary extension shown in dashed lines, a tangent of a circle concentric with the axis of rotation A, which circle is also shown in dashed lines. This can create additional flow resistance, which can prevent flow into the radial gap 31.

The invention is not limited in its implementation to the preferred embodiments given above. Rather, a number of variants are conceivable which make use of the solution presented even in fundamentally different designs.

The invention claimed is:

1. An inlet nozzle assembly for suction-side arrangement on an impeller rotatable about a rotation axis, comprising:

a front end section and an adjoining casing section, wherein the casing section has a circumferential wall surrounding the rotation axis, which forms a receiving space for receiving the impeller, so that a radial gap is formed in the radial direction between the circumferential wall and a radially outer end section of the impeller, and wherein the front end section has a front end wall with an inlet nozzle which extends into the receiving space, wherein an axial gap is formed in the front end section between the front end wall and an end face of the impeller, wherein radial ribs extend from the circumferential wall into the receiving space, which are configured to reduce the radial gap, or that axial ribs extend from the end wall to the receiving space, which are configured to reduce the axial gap, wherein the impeller rotatable about the rotation axis has impeller blades and a cover plate configured to delimit the impeller blades in an axial direction, wherein the receiving space is configured to completely receive the cover plate, so that the radial gap is formed in the radial direction between the circumferential wall and the cover plate, and wherein the axial gap is formed in the front end section between the front end wall and the cover plate;

and wherein the front end wall of the front end section extends radially into the receiving space.

2. The inlet nozzle assembly according to claim 1, wherein the radial ribs are configured to correspond to the radially outer end portion of the impeller, and wherein radially inner edges of the radial ribs are configured to follow the outer contour of the radially outer end portion of the impeller and to correspond thereto.

3. The inlet nozzle assembly according to claim 1, wherein the front end wall has a thickness in the axial direction, by which an axial length of the inlet nozzle is determined, and wherein the thickness is sized to reduce the axial gap to a minimum.

4. The inlet nozzle assembly according to claim 1, wherein the radial ribs are irregularly and/or unevenly distributed and/or asymmetrically arranged in the circumferential direction around the axis of rotation.

5. The inlet nozzle assembly according to claim 1, wherein at least one section of at least one radial rib is tilted relative to the axis of rotation.

6. The inlet nozzle assembly according to claim 1, wherein at least one section of at least one radial rib is helically wound around the rotation axis.

7. The inlet nozzle assembly according to claim 1, wherein the at least one radial rib intersects the rotation axis in an imaginary extension in the radial direction or forms a tangent of a circle concentric with the rotation axis.

8. The inlet nozzle assembly according to claim 1, wherein the radial ribs are configured to extend with their axial end portions in the axial direction beyond the radially outer end portion of the impeller.

9. The inlet nozzle assembly according to claim 1, wherein the radial ribs with their axial end sections form a guide device which is configured to direct a flow emerging from the impeller away from the radial gap and/or is configured to continue surface formed by the imaginary lateral surface of the impeller formed by the radially outer end section of the impeller and/or a flow channel.

10. A turbomachine with an impeller that can be driven about a rotational axis and an inlet nozzle assembly according to claim 1, wherein the impeller is received in the receiving space of the inlet nozzle assembly so as to be rotatable about the rotation axis and is configured to generate a flow from an inflow side to an outflow side when rotating about the rotation axis.

11. The turbomachine according to claim 10, wherein the impeller has a predetermined concentricity tolerance and describes a maximum contour determined by the concentricity tolerance through its radially outer end section when rotating about the rotation axis at a specified rotational speed, wherein the axial ribs and/or the radial ribs extend without contact up to the maximum contour.

12. The inlet nozzle assembly according to claim 1, wherein the axial ribs extend from the end wall to the receiving space, which are configured to reduce the axial gap.

13. The inlet nozzle assembly according to claim 1, wherein the cover plate extends circumferentially around an exterior of the impeller blades.

* * * * *